US010520627B2

(12) United States Patent
Saberi

(10) Patent No.: US 10,520,627 B2
(45) Date of Patent: *Dec. 31, 2019

(54) MODELING AN ELASTIC STIFFNESS TENSOR IN A TRANSVERSE ISOTROPIC SUBSURFACE MEDIUM

(71) Applicant: CGG SERVICES SAS, Massy (FR)

(72) Inventor: Reza Saberi, The Hague (NL)

(73) Assignee: CGG SERVICES SAS, Massy (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/838,501

(22) Filed: Dec. 12, 2017

(65) Prior Publication Data

US 2018/0100941 A1  Apr. 12, 2018

Related U.S. Application Data

(63) Continuation of application No. 15/116,299, filed as application No. PCT/IB2015/002375 on Nov. 24, 2015, now Pat. No. 9,874,652.

(Continued)

(51) Int. Cl.
*G01V 1/50* (2006.01)
*G01V 1/48* (2006.01)

(52) U.S. Cl.
CPC .......... *G01V 1/50* (2013.01); *G01V 1/48* (2013.01); *G01V 2210/614* (2013.01); *G01V 2210/626* (2013.01)

(58) Field of Classification Search
CPC ...... G01V 1/50; G01V 1/48; G01V 2210/614; G01V 2210/626

(Continued)

(56) References Cited

U.S. PATENT DOCUMENTS 5,398,215 A * 3/1995 Sinha ............... G01V 1/44
367/27
9,874,652 B2 * 1/2018 Saberi .............. G01V 1/50
2010/0312534 A1 12/2010 Xu et al.

FOREIGN PATENT DOCUMENTS

GB           497329 A  * 12/1938

OTHER PUBLICATIONS

Backus, G. E.; "Long-wave anisotropy produced by horizontal layering"; Journal of Geophysical Research; vol. 67, No. 11; Oct. 1962; pp. 4427-4440.

(Continued)

*Primary Examiner* — Daniel L Murphy
(74) *Attorney, Agent, or Firm* — Patent Portfolio Builders PLLC

(57) ABSTRACT

Modeling an elastic stiffness tensor in a transverse isotropic subsurface medium acquires well log data for at least one well passing through the transverse isotropic subsurface medium. The transverse isotropic subsurface medium is divided into an effective anisotropic layer and an isotropic layer. The effective anisotropic layer elastic parameters are modeled, and the isotropic layer elastic parameters are modeled using the effective anisotropic layer elastic parameters and the acquired well log data. The modeled effective anisotropic layer elastic parameters and the modeled isotropic layer elastic parameters are used to upscale the effective anisotropic layer and the isotropic layer into the transverse isotropic subsurface medium comprising a single layer and to determine the five members of the elastic stiffness tensor for the transverse isotropic subsurface medium.

19 Claims, 5 Drawing Sheets

Related U.S. Application Data

(60) Provisional application No. 62/084,041, filed on Nov. 25, 2014.

(58) Field of Classification Search
USPC .......................................................... 367/37
See application file for complete search history.

(56) References Cited

OTHER PUBLICATIONS

C.L. Liner et al., "Layer-Induced Seismic Anisotropy from Full-Wave Sonic Logs: Theory, Application, and Validation", Geophysics, Nov.-Dec. 2006, vol. 71, No. 6, pp. D183-D190.

D. Kumar, "Applying Backus Averaging for Deriving Seismic Anisotropy of a Long-Wavelength Equivalent Medium from Well-Log Data", Journal of Geophysical Engineering, 2013, vol. 10, pp. 1-15.

Imply vs. Infer, 2017, downloaded Jun. 1, 2017 from https://grammarly.com/blog/imply-infer/, 8 pages.

International Search Report in related International Application No. PCT/IB2015/002375, dated May 11, 2016.

L. Thomsen, "Weak Elastic Anisotropy", Geophysics, Oct. 1986, vol. 51, No. 10, pp. 1954-1966.

Office Action in corresponding Canadian Application No. 2,938,367 dated Oct. 6, 2017.

Office Action in corresponding Canadian Application No. 2,938,367, dated Mar. 20, 2017.

Office Action in corresponding Canadian Application No. 2,938,367, dated Sep. 2, 2016.

Office Action in corresponding European Application No. 15 823 755.2 dated Nov. 24, 2016. (Reference D1, D2 and D3 were previosuly submitted in an Information Disclosure Statement dated Aug. 3, 2016.).

S. Xu et al., "A New Velocity Model for Sand-Clay Mixtures", EAGE 55th Meeting and Technical Exhibition, Stavanger, Norway, Jun. 7-11, 1993.

T. Alkhalifah et al., "Velocity Analysis for Transversely Isotropic Media", Geophysics, Sep.-Oct. 1995, vol. 60, No. 5, pp. 1550-1566.

Written Opinion of the International Searching Authority in related International Application No. PCT/IB2015/002375, dated May 11, 2016.

Z. Hashin et al., "A Variational Approach to the Theory of the Elastic Behaviour of Multiphase Materials", Journal of Mechanical Physical Solids, 1963, vol. 11, pp. 127-140, Pergamon Press Ltd, GB.

Office Action in corresponding Canadian Application No. 2,938,367 dated Oct. 4, 2017.

Canadian Office Action for Canadian Application No. 2,938,367 dated Sep. 11, 2019.

\* cited by examiner

MODELING AN ELASTIC STIFFNESS TENSOR IN A TRANSVERSE ISOTROPIC SUBSURFACE MEDIUM

CROSS REFERENCE TO RELATED APPLICATIONS

This application claims priority and benefit from U.S. Provisional Patent Application No. 62/084,041, filed Nov. 25, 2014, for "Modelling Elastic Stiffness Tensor in a TI Medium", the entire contents of which is incorporated herein by reference.

TECHNICAL FIELD

Embodiments of the subject matter disclosed herein generally relate to methods and systems for imaging and characterizing a subsurface.

BACKGROUND

Velocity anisotropy, which is known as the directional dependency of velocities, is important in subsurface imaging and characterization. Most elasticity theories consider an isotropic medium as their main assumption for addressing the problems in the field of reservoir geophysics. This assumption is challenged by the reality of the subsurface, which could be made up of structures such as beds and fractures and which has gone through a complex geological history. These factors can make the subsurface of the Earth deviate significantly from the isotropic assumption used in the routine algorithms and approaches.

In general, four classes of anisotropy are defined that range from a completely isotropic medium (with two elastic constants) to a completely anisotropic medium (with 21 elastic constants). The four classes refer to specific conditions where the number of elastic stiffness constants can be reduced. The four classes are named Cubic with 3 independent elastic constants, Transverse Isotropic (TI) with 5 independent elastic constants, Orthorhombic with 9 independent elastic constants and Monoclinic with 13 independent elastic constants. A TI medium provides the closest description of sedimentary rock.

Conventionally, anisotropy in the context of isotropic approaches is handled using Thomsen parameters and approximation. Thomsen suggested three parameters to correct for anisotropy effects in weak-anisotropy mediums. These parameters, $\varepsilon$, $\delta$ and $\gamma$, are now used regularly in all reservoir geophysics disciplines to address anisotropy effects. However, calculation of the Thomsen parameters requires information such as laboratory data or well tracks in different directions compared with the symmetry axis which are expensive to apply in practice. Therefore, the need still exists to improve cheaper methods for calculating anisotropy parameter in the form of stiffness tensor or Thomsen parameters in a TI subsurface.

SUMMARY

Embodiments are directed to systems and methods that utilize a rock physics workflow to model the elastic stiffness tensor in a transverse isotropic (TI) medium using conventional well-log suites, i.e., conventional suites of well-log data. The workflow uses downscaling followed by upscaling of normal logs by the Backus model. The rock physics modelling is performed within the downscaling step. The resulting downscaling step is where anisotropy information is integrated with the well log information through the rock physics models. These anisotropy factors are in a scale much smaller than the wavelength, and the anisotropic layer is seen as an effective isotropic medium. Following downscaling with rock physics modelling using the integrated anisotropy information, the modelled logs are upscaled to the measured ones. This workflow provides a first estimate of anisotropic effects and can be seen in the context of boundary models to define the possible anisotropy boundary of an area. Therefore, the workflow assists in the determination of possible ranges of anisotropy changes in a vertical well within a TI medium. Furthermore, the workflow can be used to determine the Thomsen parameters, i.e., $\varepsilon$, $\delta$ and $\gamma$, ranges when no other data is available except conventional well-logs. The results of this model can be improved through integration with seismic (e.g. inversion) or laboratory (e.g. core analysis) data.

Embodiments are directed to a method for modeling an elastic stiffness tensor in a transverse isotropic subsurface medium. Well log data are acquired for at least one well passing through the transverse isotropic subsurface medium. In one embodiment, the well log data are acquired in a direction parallel to a symmetry axis passing through layers in the transverse isotropic subsurface medium.

The transverse isotropic subsurface medium is divided into an anisotropic layer and an isotropic layer such that a sum of an anisotropic layer volume fraction and an isotropic layer volume fraction equals one. Effective anisotropic layer elastic parameters are modelled. The effective anisotropic layer elastic parameters include an anisotropic layer density, an anisotropic layer p-wave velocity and an anisotropic layer s-wave velocity. In one embodiment, modeling the effective anisotropic layer elastic parameters further includes calculating an anisotropic layer density as a volume weighted average of all anisotropic component densities in the anisotropic layer and modeling an anisotropic layer p-wave velocity and an anisotropic layer s-wave velocity along a symmetry axis of the transverse isotropic subsurface medium using a rock physics model selected in accordance with a source of anisotropy in the anisotropic layer. In one embodiment, the rock physics model includes intrinsic factors in the anisotropy layer or extrinsic factors in the anisotropy layer. Modeling the effective anisotropic layer p-wave velocity and anisotropic layer s-wave velocity also includes using additional anisotropy data containing at least one of core data, core ultrasonic measurements for a plurality of wave propagation angles and seismic data.

The isotropic layer elastic parameters are modeled using the anisotropic layer elastic parameters and the acquired well log data. The isotropic layer elastic parameters include an isotropic layer density, an isotropic layer p-wave velocity and an isotropic layer s-wave velocity. In one embodiment, modeling the isotropic layer elastic parameters includes using measured p-wave velocity and measured s-wave velocity from the acquired well log data and modeled effective anisotropic layer p-wave velocity and effective anisotropic layer s-wave velocity in a simplified Backus model for a two layer transverse isotropic medium and wave propagation normal to layering in the two layer isotropic medium to model the isotropic layer elastic parameters.

The modeled effective anisotropic layer elastic parameters and the modeled isotropic layer elastic parameters are used to upscale the effective anisotropic layer and the isotropic layer into the transverse isotropic subsurface medium having a single layer and to determine the elastic stiffness tensor for the transverse isotropic subsurface medium.

In one embodiment, using the modeled effective anisotropic layer elastic parameters and the modeled isotropic layer elastic parameters to upscale the effective anisotropic layer and the isotropic layer into the transverse isotropic subsurface medium includes using the effective anisotropic layer elastic parameters to determine two effective Lame's parameters ($\lambda_A$ and $\mu_A$) and using the isotropic layer elastic parameters to determine two Lame's parameters ($\lambda_I$ and $\mu_I$). In addition, the effective anisotropic layer Lame's parameters ($\lambda_A$ and $\mu_A$) and the isotropic layer Lame's parameters ($\lambda_I$ and $\mu_I$) are combined to yield five independent members of the transverse isotropic subsurface medium elastic tensor ($C_{11}$, $C_{12}$, $C_{13}$, $C_{33}$ and $C_{44}$). In one embodiment, a full Backus model is used. In one embodiment, the five independent transverse isotopic subsurface elastic tensor members ($C_{11}$, $C_{12}$, $C_{13}$, $C_{33}$ and $C_{44}$) are used to calculate transverse isotropic subsurface medium p-wave velocities and transverse isotropic subsurface medium s-wave velocities for a plurality of wave propagation angles with respect to an axis of symmetry in the transverse isotropic subsurface medium.

In one embodiment, using the modeled effective anisotropic layer elastic parameters and the modeled isotropic layer elastic parameters to upscale the effective anisotropic layer and the isotropic layer into the transverse isotropic subsurface medium includes using the effective anisotropic layer elastic parameters to determine effective anisotropic layer Lame's parameters ($\lambda_A$ and $\mu_A$), using the isotropic layer elastic parameters to determine two Lame's parameters for the isotropic layer ($\lambda_I$ and $\mu_I$), and combining the effective Lame's parameters for the anisotropic layer and the Lame's parameters for the isotropic layer to yield five independent transverse isotropic subsurface medium elastic tensor members ($C_{11}$, $C_{12}$, $C_{13}$, $C_{33}$ and $C_{44}$) for the subsurface medium.

Embodiments are also directed to a computer-readable medium containing computer-executable code that when read by a computer causes the computer to perform a method for modeling an elastic stiffness tensor in a transverse isotropic subsurface medium by acquiring well log data for at least one well passing through the transverse isotropic subsurface medium, dividing the transverse isotropic subsurface medium into an anisotropic layer and an isotropic layer such that a sum of an anisotropic layer volume fraction and an isotropic layer volume fraction equals one, modeling effective anisotropic layer elastic parameters, modeling isotropic layer elastic parameters using the anisotropic layer elastic parameters and the acquired well log data and using the modeled effective anisotropic layer elastic parameters and the modeled isotropic layer elastic parameters to upscale the effective anisotropic layer and the isotropic layer into the transverse isotropic subsurface medium comprising a single layer and to determine the elastic stiffness tensor for the transverse isotropic subsurface medium.

Embodiments are also directed to a computing system for modeling an elastic stiffness tensor in a transverse isotropic subsurface medium. The computing system includes a storage device containing well log data for at least one well passing through the transverse isotropic subsurface medium and a processer in communication with the storage device. The processor is configured to divide the transverse isotropic subsurface medium into an effective anisotropic layer and an isotropic layer such that a sum of an effective anisotropic layer volume fraction and an isotropic layer volume fraction equals one, model effective anisotropic layer elastic parameters, model isotropic layer elastic parameters using the effective anisotropic layer elastic parameters and the acquired well log data and use the modeled effective anisotropic layer elastic parameters and the modeled isotropic layer elastic parameters to upscale the effective anisotropic layer and the isotropic layer into the transverse isotropic subsurface medium comprising a single layer and to determine the five independent members of the elastic stiffness tensor for the transverse isotropic subsurface medium ($C_{11}$, $C_{12}$, $C_{13}$, $C_{33}$ and $C_{44}$).

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Embodiments of systems and methods use a rock physics workflow to model changes in the elastic stiffness tensor due to anisotropy in a vertical well, i.e., a well extending parallel to the symmetry axis. This elastic stiffness tensor can be used to calculate the Thomsen parameters or even to model velocities directly. Conventional well logs for the vertical well and other wells passing through the subsurface are used as input. These well logs provide elastic parameters in the symmetry direction within a transverse-isotropic medium. In one embodiment, the information obtained from the conventional well logs is tied with other anisotropy information to yield an estimation of anisotropy with increased accuracy.

Hooke's law for a general linear and elastic anisotropic solid gives a simple relationship to relate stress variations ($\sigma_{ij}$) and strain changes ($\varepsilon_{ij}$) through a fourth-rank tensor referred to as the stiffness tensor ($\overline{C_{ijkl}}$) This stiffness tensor characterizes the elasticity of the medium using a total of 81 components and follows the laws of tensor transformation. The symmetry of stresses and strains as well as symmetry within the tensor itself reduces the number of components to 21 independent constants, which is the maximum number of independent elastic constants that any homogeneous linear elastic anisotropic medium can have.

However, the more common form Hook's law is the one using the Voigt notation, which is summarized as:

$$\sigma_I = \overline{C_{ij}} \varepsilon_J \quad (1)$$

Figure 1:
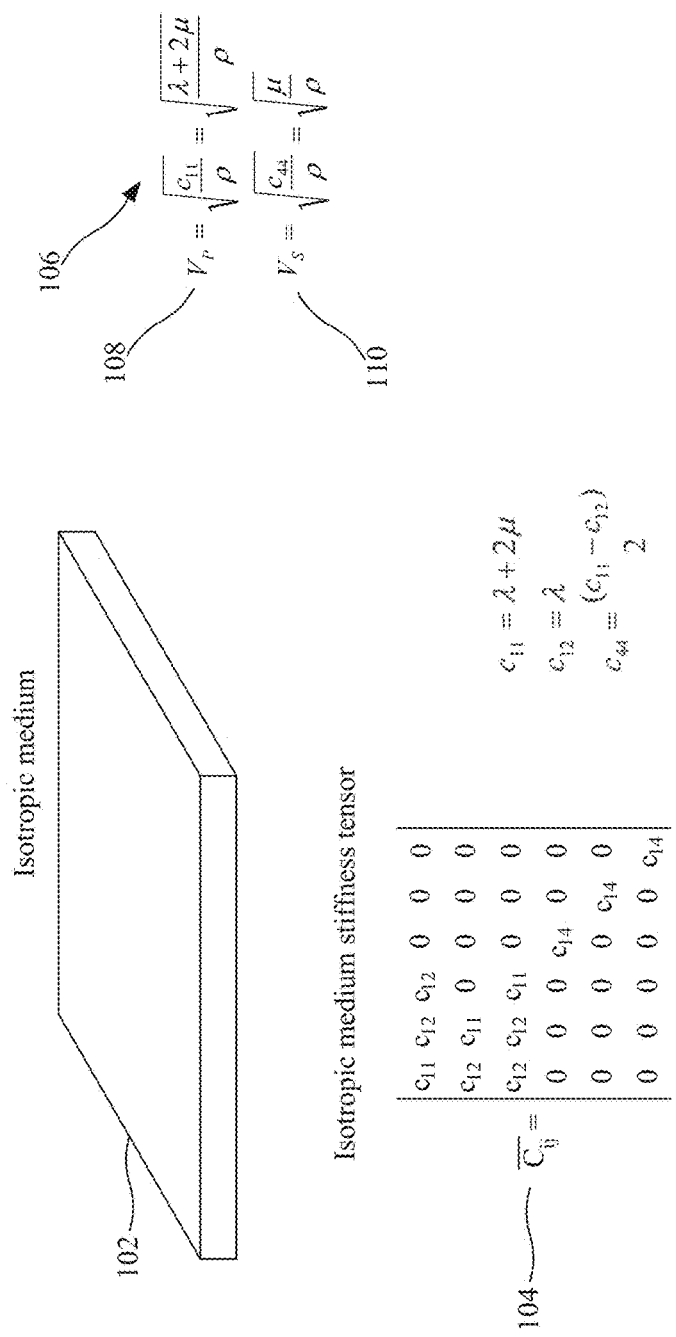
FIG. 1 is a representation of an embodiment of stiffness tensor and velocities for an isotropic medium.

This form is more popular due to its simplicity in calculations by reducing the indices. Here, $\overline{C_{ij}}$ matrix has 21 independent elastic constants for an anisotropic medium (same as the $\overline{C_{ijkl}}$ tensor). The component number of stiffness elastic matrix reduces to two (Lame's parameters $\lambda$ and $\mu$) for an isotropic linear elastic material. FIG. 1 shows a simple sketch that expresses $\overline{C_{ij}}$ matrix and its components for an isotropic medium along with isotropic velocities ($V_p$ and $V_s$) which are can be expressed based on these stiffness constants.

Referring to FIG. 1, an isotropic medium 102, for example, an isotropic subsurface medium has a stiffness tensor 104 illustrated as a matrix containing a plurality of elastic stiffness components. The isotopic medium also has associated velocities 106 for waves propagating through the medium, including a p-wave velocity 108 and an s-wave velocity 110. However, the number of elastic stiffness components within the stiffness tensor $\overline{C_{ij}}$ matrix increases as the medium approaches a state of anisotropy. Therefore, the equations described above for an isotropic medium will no longer be valid as the number of elastic stiffness constants increases, and the isotropic velocities are not sufficiently accurate for an anisotropic medium. The accuracy of the isotropic velocities decrease as the subsurface medium becomes more anisotropic due to an increase in the number of elastic constants.

Regarding anisotropy in TI mediums and Thomsen parameters, TI mediums are defined as materials that show isotropy in one direction and anisotropy in a direction perpendicular to the isotropy plane. The direction of anisotropy is normally referred to as the symmetry axis. In such conditions, the number of $\overline{C_{ij}}$ matrix constants increases to five independent components, and isotropic velocities are changed accordingly as below:

$$V_{QP} = \sqrt{\frac{c_{11}\sin^2\theta + c_{33}\cos^2\theta + c_{44} + \sqrt{M}}{2\rho}} \quad (2)$$

$$V_{QSV} = \sqrt{\frac{c_{11}\sin^2\theta + c_{33}\cos^2\theta + c_{44} - \sqrt{M}}{2\rho}}$$

$$V_{SH} = \sqrt{\frac{c_{66}\sin^2\theta + c_{44}\cos^2\theta}{\rho}}$$

$$M = [(c_{11} - c_{44})\sin^2\theta - (c_{33} - c_{44})\cos^2\theta]^2 + (c_{13} + c_{44})^2\sin^2 2\theta$$

Here, $V_{QP}$ and $V_{QSV}$ are the quasi-longitudinal mode and quasi-shear mode velocities, while $V_{SH}$ is the horizontal shear velocity. $\theta$ is the angle between the wave vector and the symmetry axis of the TI medium. For a TI subsurface medium, the symmetry axis is perpendicular to the isotropic layers in the TI subsurface medium. For wave vectors propagating along or parallel to the symmetry axis, $\theta=0$.

Thomsen (1986) approximated these velocities in a TI medium for a weakly elastic anisotropic scenario as follows:

$$V_{QP} \approx V_P(0)(1 + \delta\sin^2\theta\cos^2\theta + \varepsilon\sin^4\theta) \quad (3)$$

$$V_{QSV} \approx V_S(0)\left[1 + \frac{V_P(0)}{V_S(0)}(\varepsilon - \delta)\sin^2\theta\cos^2\theta\right]$$

$$V_{SH} \approx V_S(0)(1 + \gamma\sin^2\theta)$$

Here, $\varepsilon$, $\delta$ and $\gamma$, which are known as Thomsen anisotropic parameters, are defined as:

$$\varepsilon = \frac{c_{11} - c_{33}}{2c_{33}} \quad (4)$$

$$\delta = \frac{(c_{13} + c_{44})^2 - (c_{33} - c_{44})^2}{2c_{33}(C_{33} - C_{44})}$$

$$\gamma = \frac{c_{66} - c_{44}}{2c_{44}}$$

and $V_P(0)$ and $V_S(0)$ are the velocities along the symmetry axis with following definitions:

$$V_P(0) = \sqrt{\frac{c_{33}}{\rho}} \quad (5)$$

$$V_S(0) = \sqrt{\frac{c_{44}}{\rho}}$$

These two velocities, which represent the slowest velocities in the TI medium, can also be calculated using equation (2) with $\theta=0$. In other words, the Thomsen equation calculates velocities in the symmetry direction and then adds anisotropy effects into these velocities using the three Thomsen parameters. The result is that five independent elastic parameters having no physical meaning are translated into three parameters ($\varepsilon$, $\delta$ and $\gamma$) with a certain physical meaning. In particular, $\varepsilon$, which is also referred to as P-wave anisotropy, represents the fractional difference between the P-wave velocities in the horizontal and vertical directions, and $\delta$ can be related to both near vertical P-wave velocity and angular SV-wave velocity variations. The parameter $\gamma$ has the same role as $\varepsilon$ but for S-wave velocity by representing the fractional difference between the SH-wave velocities in the horizontal and vertical directions. Therefore, these three parameters can be used to describe a TI medium, and a measure of these parameters is used in the anisotropic modeling workflow.

Following Thomsen, work on these three parameters and their combination (e.g. Alkhalifah and Tsvankin, 1995) modeled wave propagation in an anisotropic medium. However, the Thomsen approximation is valid for weak anisotropy, and calculating $\varepsilon$, $\delta$ and $\gamma$ is not easy. In the following, the anisotropy problem in TI mediums is reviewed by looking at anisotropy effects on the stiffness matrix $\overline{C_{ij}}$ using the Backus (1962) model. A workflow that only needs conventional well-logs is used to model anisotropy in TI mediums. In one embodiment, this approach is coupled to other anisotropic workflows for a more accurate anisotropic modeling.

Regarding the Backus model and stiffness tensor in a VTI medium, Postma (1955) showed that in a heterogeneous media, anisotropy is a scale-dependent property where a two-layer layered medium can behave as an anisotropic medium if each of the two layers is isotropic in a finer scale than the wavelength of the seismic waves. Furthermore, Backus (1962) extended the work of Postma (1955) into general media with three or more layers. Backus (1962) showed that in the long wavelength limit a stratified medium composed of isotropic layers still can make a TI medium. This theory allows a bunch of layers to be replaced by a single anisotropic layer or a single anisotropic medium to be decomposed into a bunch of isotropic layers. This implies that anisotropy is a frequency (scale) dependent phenomenon, and fine isotropic layering (higher frequency) can express itself as anisotropy on a larger scale (lower frequencies).

Conventionally, such a stratified medium with fine layering is replaced with a homogenous, transversely isotropic material. In particular, anisotropy can be defined on different scales from large scale, e.g., medium layering or fractures, down to fine scale, e.g., grain alignments or cracks, and the measurement scale decides if that medium behaves as isotropic or anisotropic. For normal incidence seismic wave propagation, when these anisotropy features (like the stratified medium) are on a scale much finer than the wavelength of seismic waves, the waves will average their elastic properties, and the medium will behave as a homogeneous effective medium. In this regard, the Backus average is typically considered as the low frequency, while ray theory defines the high frequency limit of the medium velocity. Embodiments utilize this concept, model anisotropic velocity in one scale and treat anisotropic velocity as isotropic velocity in another scale.

Backus derived the effective elastic constants for a stratified medium composed of TI layers in the long-wavelength limit. This method replaces the stratified medium with an equivalent TI medium, and the fine layers can be either isotropic or anisotropic with a spatially periodic or non-periodic pattern. In the case of TI fine layers, the general elastic stiffness constants for the equivalent TI medium can be written as follows using the Backus model:

$$C_{11} = \langle c_{11} - c_{13}^2 c_{33}^{-1} \rangle + \langle c_{33}^{-1} \rangle^{(-1)} \langle c_{13} c_{33}^{-1} \rangle^2$$

$$C_{12} = \langle c_{12} - c_{13}^2 c_{33}^{-1} \rangle + \langle c_{33}^{-1} \rangle^{(-1)} \langle c_{13} c_{33}^{-1} \rangle^2$$

$$C_{13} = \langle c_{33}^{-1} \rangle^{(-1)} \langle c_{13} c_{33}^{-1} \rangle$$

$$C_{33} = \langle c_{33}^{-1} \rangle^{(-1)}$$

$$C_{44} = \langle c_{44}^{-1} \rangle^{(-1)}$$

$$C_{66} = \langle c_{66} \rangle \quad (6)$$

Figure 2:
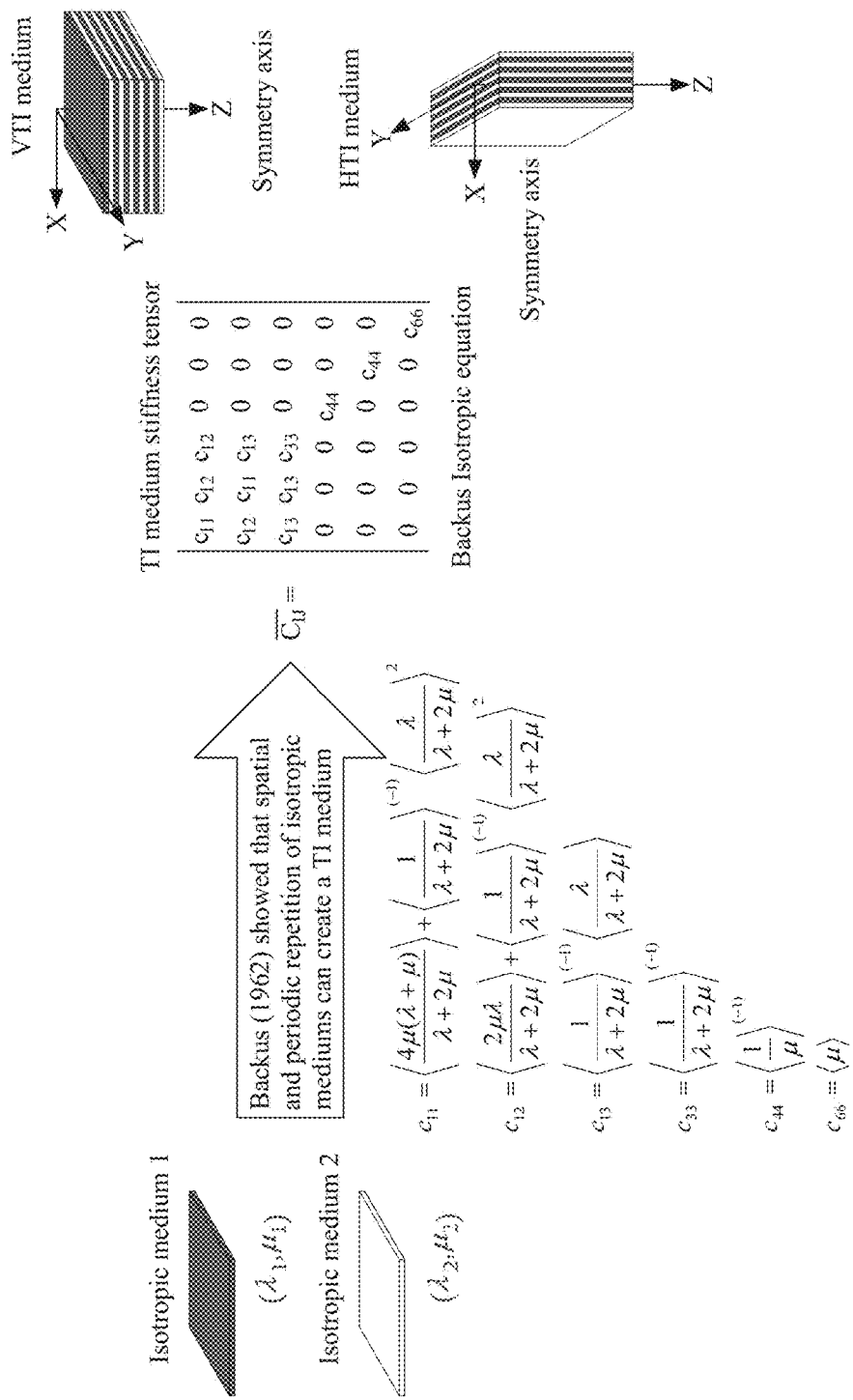
FIG. 2 is a representation of an embodiment of stiffness tensor for isotropic and transverse isotropic mediums.

The brackets indicate averages of the enclosed properties weighted by their volumetric proportions. $C_{IJ}$ and $c_{IJ}$ are referring to the constants of elastic TI equivalent medium and fine layers. If individual fine layers are isotropic, the equivalent medium is still a TI medium. The elastic constants of such a TI medium can be calculated using equation (6) as illustrated in FIG. 2, which illustrates the stiffness tensor for isotropic and TI mediums. Backus showed that periodic repetition of two isotropic layers each with two elastic constants can create a TI medium with five independent elastic constants. As illustrated in FIG. 2, the brackets indicate averages of the enclosed properties weighted by their volumetric proportions, and $\lambda$ and $\mu$ are Lame's parameters for each isotropic layer.

This implies that a TI medium stiffness matrix ($\overline{C_{IJ}}$) can be created by adding some isotropic layers together and averaging their elastic properties using the isotropic Backus model. The Backus model can be simplified even more considering normal wave propagation to the fine layering. It can be expressed as follows for a medium containing two layers:

$$\frac{1}{\rho V_P^2} = \frac{f_1}{\rho_1 V_{P1}^2} + \frac{f_2}{\rho_2 V_{P2}^2} \quad (7)$$

$$\frac{1}{\rho V_S^2} = \frac{f_1}{\rho_1 V_{S1}^2} + \frac{f_2}{\rho_2 V_{S2}^2}$$

Here, $V_p$ and $V_s$ are the equivalent TI medium P- and S-wave velocities, and $\rho$ is their bulk density. The variables $f_1$ and $f_2$ are the volume fractions of composed fine layers. The index numbers 1 and 2 refer to these layers and their elastic parameters such as velocities and densities.

Equation (7) assumes that the two layers, e.g., the isotropic layer and the effective anisotropic layer, are on a much finer scale than the seismic wavelengths. In this case, the waves will average the physical properties of the fine layers, so that the material becomes a homogeneous effective medium with velocities for plane-wave propagation normal to the layering.

In accordance with an embodiment for modelling elastic constants in a TI medium, the TI medium can be considered as a stack of two periodic layers, either isotropic or anisotropic or a combination of isotropic and anisotropic. A model of the subsurface is created containing two layers: a first layer containing all anisotropic factors and components and a second layer representing the balance of the subsurface medium and lacking any anisotropic behavior. All anisotropic minerals, e.g., clay, and factors, e.g., fracture and cracks, are considered separately in the first or anisotropic layer, and the rest of the subsurface medium with isotropic behavior is the second isotropic layer.

Based on the Backus model, the equivalent effective medium containing these two layers (isotropic and effective anisotropic) behaves as a TI medium. Therefore, splitting a given subsurface medium into two separate layers secures a TI behavior for the equivalent effective medium. The combination between the isotropic and effective anisotropic layers facilitates manipulating the anisotropy degree for the equivalent medium such that the lowest anisotropy is possible when both layers are isotropic (without any anisotropic factor included into the rock physics modeling) and highest anisotropy happens when rock physics modelling is done and anisotropic factors are intensified in the anisotropic layer.

Figure 3:
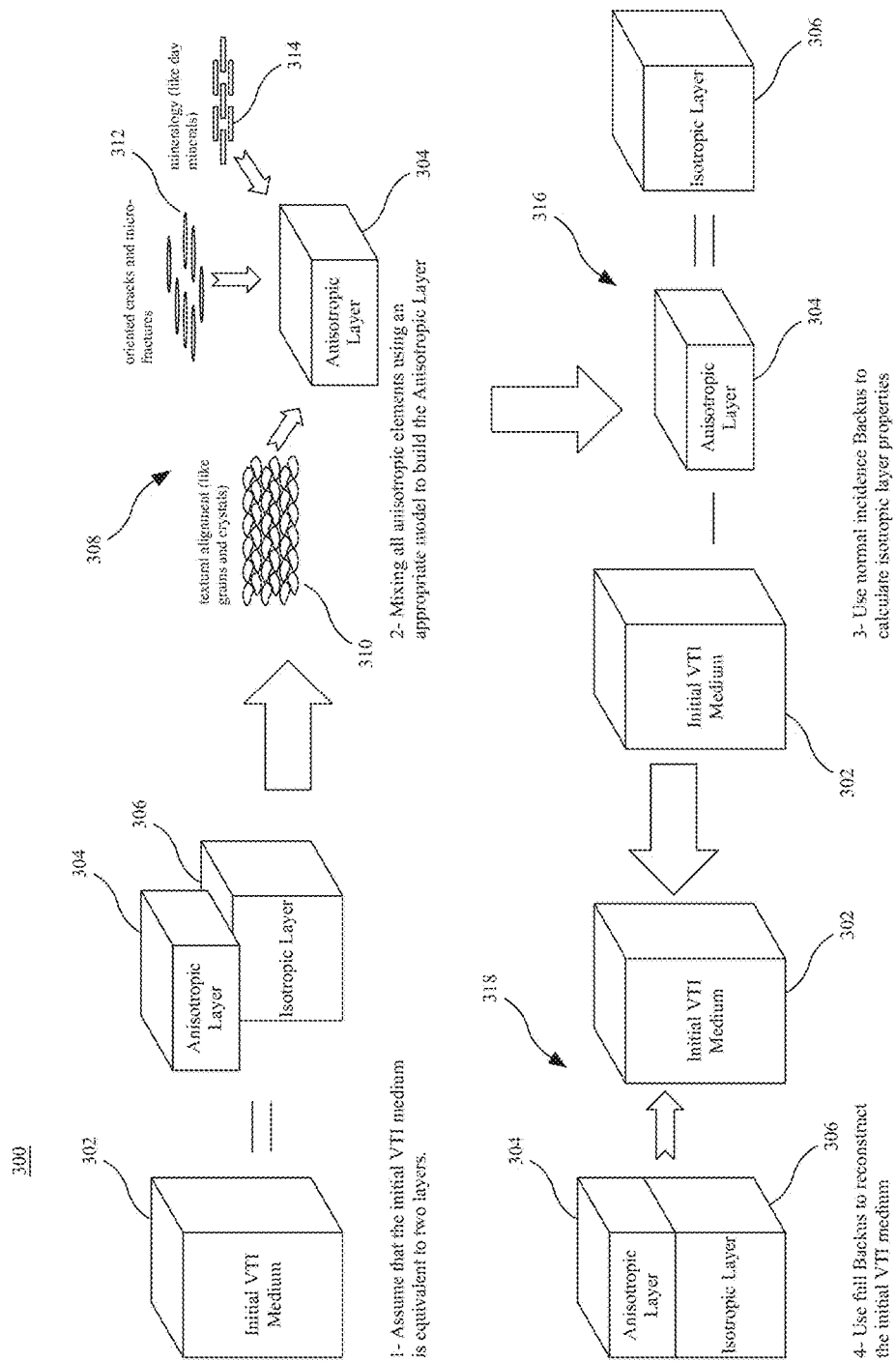
FIG. 3 is a schematic representation of an embodiment of a workflow for modeling an elastic stiffness tensor in a transverse isotropic subsurface medium.

Referring now to FIG. 3, an embodiment of the workflow for modelling an anisotropic medium 300 is illustrated. As illustrated, the workflow includes four steps. In a first step, a subsurface medium 302, which is assumed to be a TI subsurface medium, is divided into two layers, an effective anisotropic layer 304 and an isotropic layer 306. A suite of well-log data has been acquired from at least one well passing through the subsurface medium parallel to the symmetry axis of the TI subsurface medium. This suite of well-log data contains elastic log data including p-wave velocity, s-wave velocity and density. In the second step 308, rock physics modelling of the effective anisotropic layer 304, which is assumed as a TI medium is performed along the symmetry axis of the TI medium to generated elastic parameters for the effective anisotropic layer. These elastic parameters include, but are not limited to, the effective anisotropic layer p-wave velocity, the effective anisotropic layer s-wave velocity and the effective anisotropic layer density. In one embodiment, rock physics modelling combines all the initial components and elements of the anisotropic layer using a rock physics model that is suitable to the physical constituents of the subsurface. These initial components include, but are not limited to, textural alignment constituents 310 such as grains and crystals, oriented cracks and micro-fractures 312 and mineralogy constituents 314 such as clays. In one embodiment, the volume of the anisotropic layer contains shale as the main constituent.

The selection of the rock physics model to be used in generating the elastic parameters relies on information regarding the source of anisotropy in the anisotropic layer. If the source of anisotropy is related to intrinsic factors such as subsurface medium microstructure, e.g., grain alignment, then a rock physics model like the Xu & White (1995) model is used to include these intrinsic factors, e.g., clay elastic properties, in the anisotropic layer. The Xu & White rock physics model takes pore shape into account and can be considered for mixing anisotropic minerals, e.g., clay with their pore space, i.e., total porosity minus effective porosity, and pore fluid, i.e., clay bound water. If the source of anisotropy is related to extrinsic factors such as cracks and fractures, then a rock physics model such as the Hudson (1980) model is used to model the effective anisotropic layer as a cracked media. In one embodiment, it is assumed that all cracks with a preferential direction (source of TI medium) are located within the effective anisotropic layer while the non-cracked portion of the subsurface medium constitutes the isotropic layer.

Anisotropic minerals such as clay have a wide range of elastic properties that differ from one type to another or even with depth in the subsurface due to the digenesis. Even Hudson model utilizes some information on crack and fracture characteristics. In one embodiment, the effective anisotropic layer parameters are validated by coupling this workflow to other data sources, for example, core ultrasonic measurement for different angles. Therefore, input mineral elastic properties or crack properties are updated based on the core measurement data taken at different incident angles. In addition, boundary models such as the Hashin-Shetrikman boundary model (1963) or the Voigt (1890) and Reuss (1929) models can be used to define the boundaries for anisotropic changes in a given medium.

The output of the second step is an effective anisotropic medium that averages all elastic properties and fractions of the initial components within the anisotropic layer. It is assumed that the effective anisotropic layer contains all anisotropic information with $\overline{C_{ij}}$ as the stiffness matrix. The anisotropic factors included in this layer are on a scale smaller than the wavelength, and this effective anisotropic layer is seen as an effective isotropic layer with two effective Lame's parameters to the seismic and sonic waves.

In the third step 316, the elastic properties of the isotropic layer are calculated using the effective anisotropic layer elastic properties calculated in the second step 308 and the elastic log data acquired from the well-logs, i.e., $V_P$, $V_S$ and $\rho$, which can also be referred to as the measured elastic logs. The isotropic layer elastic properties include, but are not limited to, isotropic layer p-wave velocity, isotropic layer s-wave velocity and isotropic layer density. Therefore, in this equation all parameters are available to calculate the isotropic layer elastic properties from the anisotropic layer elastic properties and the measured elastic properties from well logs. Therefore, one layer, the complete TI subsurface medium, has been downscaled into two layers, the isotropic layer and the effective anisotropic layer.

In one embodiment, equation (7), which is a simplified version of the Backus model for normal incidence, is used to calculate the isotropic layer elastic properties. Equation (7) assumes a vertical well and horizontally stratified layer. As illustrated, the modelled elastic properties for the effective anisotropic layer are subtracted from the elastic log data properties to calculate the residual. This difference or residual is the isotropic layer elastic properties. This step downscales measured elastic logs for a single TI layer into two equivalent layers such that the summation of the two layers is equivalent to the one measured subsurface layer. The effective anisotropic layer is already modelled in step two 308, and all anisotropy information with a scale smaller than the wavelength is included during the modeling.

From steps 2 and 3, 308 and 316, the elastic parameters ($V_p$, $V_s$ and $\rho$) of both layers were obtained, and in one embodiment these elastic parameters are converted into the elastic stiffness tensor members ($c_{ij}$) for each layer. For vertical wells and horizontal layers in the TI subsurface medium, any given well is vertical, perpendicular to the isotropic layers, parallel to the direction of the symmetry axis and aligned with the direction of the wave vector. Therefore, as discussed above, the value of $\theta$ is set to 0 in equation (2), which simplifies this equation into equation (7). Using equation (7), the elastic parameters for the isotropic layer and the elastics parameters for the effective anisotropic layer are used to determine the Lame's parameters for each layer. For the isotropic layer, the independent elastic stiffness tensor members are $c_{11_I}$ and $c_{12_I}$, and for the effective anisotropic layer, the independent elastic stiffness tensor members are $c_{11_A}$ and $c_{12_A}$. Note that Backus model is valid for long-wavelength. This means that each of these two layers are seen as isotropic layer by wave propagation (anisotropic factors are in much smaller scale compared with wavelength as described herein). This implies that these two layers can be expressed by using their Lame's parameters ($\lambda$ and $\mu$) in the sonic wavelength scale. Therefore, the calculated velocities in the symmetry direction (calculated in the previous step) for each layer will be translated into Lame's parameter for each layer.

The fourth step 318 uses equation (6) to upscale the two layers 304,306 into the one layer 302 such that the effective elastic tensor within the single layer TI subsurface medium can be determined. In one embodiment, equation (6) is used to generate the effective elastic stiffness tensors for the upscaled single layer TI subsurface medium. The effective elastic stiffness tensor of these two layers using equation (6) is $C_{11}$, $C_{12}$, $C_{13}$, $C_{33}$ and $C_{44}$. In the long-wavelength as being assumed by Backus, each layer is seen as isotropic with two independent elastic stiffness members. In such cases, equation (6) can be written in terms of Lame's parameters as been given in FIG. 2.

Having established the elastic tensor members for each of the two layers, a single set of five elastic tensor members is calculated for the upscaled single layer TI subsurface medium. In one embodiment, equation (6) is used with the sum of the Lame's parameters of two layers into a single set of five independent elastic tensor members, $C_{11}$, $C_{12}$, $C_{13}$, $C_{33}$ and $C_{44}$. The result is that the isotropic layer and the effective anisotropic layer have upscaled into the single layer TI subsurface medium, and the elastic stiffness constant for that single layer is known from the full version of the Backus model.

In one embodiment, in addition to the elastic stiffness constant for the resulting single layer TI subsurface medium, the p-wave and s-wave velocities are also calculated for the TI subsurface medium. In one embodiment, the five independent elastic stiffness tensor members of the TI subsurface, $C_{11}$, $C_{12}$, $C_{13}$, $C_{33}$ and $C_{44}$, are used in equation (2) to calculate the velocities. The measured elastic parameters from the acquired elastic logs were only valid for $\theta=0$. However, using the five elastic stiffness tensor members in combination with equation (2), facilitates the calculation of subsurface velocities for any value of $\theta$. Therefore, using the first elastic stiffness tensor members with any given angle yields the associated subsurface velocities for that given angle or along the associated direction of wave propagation. Therefore, the anisotropic velocities have been calculated using only the measured well logs by downscaling and again upscaling the measured logs in a vertical well, i.e., $\theta=0$.

Regarding Lame's parameters, these parameters are a combination of the elastic tensor members, which is illustrated, for example, FIG. 1. Lame's parameters are used to describe an Isotropic layer having only two independent elastic stiffness tensor members, $c_{11}$ and $c_{12}$. Therefore, in one embodiment, Lame's parameters are used for the effective anisotropic layer (which is isotropic in larger scale) and isotropic layer instead of the elastic stiffness tensors members, and the resulting equations are simplified.

The upscaled velocity logs will be identical to the measured velocity logs as the same logs were used in generating the two fine layers in the previous step, although the five independent constants will be different for different scenarios. These five elastic constants will change in a way that the modelled logs will be equivalent to the measured log along the symmetry axis ($\theta=0$). But the (anisotropic) information used in the second step will affect modeled velocities when the incident angle of the wave front is different from zero ($\theta \neq 0$). Furthermore, equation (2) can be used to model velocities based on the modelled elastic constants at different incidence angle ($\theta$).

As illustrated, the rock physics workflow uses four steps to model elastic parameters in a TI subsurface medium. These steps reconstruct measured velocities from well logs ($V_P$ and $V_S$) by downscaling and upscaling the TI subsurface medium using the Backus model along the symmetry axis. The simplest scenario occurs when the source of anisotropy in the TI subsurface medium can be considered from fine layering, FIG. 2. This simplest scenario assumes a stack of isotropic layers for the equivalent TI medium but has a least chance of occurring in reality as other factors will cause a layer to behave like an anisotropic layer, e.g., porosity and saturation. However, the degree of anisotropy increases with an increase in the factors involved in anisotropic behavior, e.g., fractures. In either cases rock physics modelling of a first or effective anisotropic layer is used. The main assumption in this step is that the modelled layer builds an isotropic or a TI subsurface medium with the symmetry axis along the well bore direction.

The results of the previous scenario, i.e., a fine layering source of anisotropy, are then used in the second step, and the final equivalent TI medium from the previous scenario provides the effective medium for the first or effective anisotropic layer that is used in the second step. If another reason or source of the first layer anisotropy is expected, then an appropriate effective medium theory is used that includes such anisotropy into these layer elastic properties. In one embodiment, the accuracy of these modelled effective anisotropic elastic properties is confirmed using additional data. The additional data for the TI medium can be obtained from ultrasonic measurements on cores or even azimuthal inversion. Ultrasonic core measurement is a good candidate where velocities at different incident wave angle are provided. Therefore, the modelling parameters in the second step are updated in accordance with the best fit of the final equivalent medium velocities and velocities coming from ultrasonic measurements at different wave incident angles except zero ($\theta=0$). However, without such information it is only possible to define a range for changes in the TI medium elastic constants. This range can represent scenarios from low to high anisotropy, where the actual anisotropy can be located somewhere in between them.

Embodiments provide improved systems and methods for modeling elastic stiffness tensors in TI subsurface mediums using a rock physics workflow. The rock physics workflow provides a fast approach to estimating anisotropy affecting parameters using only conventional well logs from wells passing through the TI subsurface medium. Different effective medium models are coupled with the Backus model to extract elastic constants by downscaling and upscaling the elastic properties. The normal incidence Backus model is used to downscale well logs into two layers, and then the full Backus model on the same layers is applied to upscale them into the single layer TI subsurface medium. This approach can be coupled easily with any other workflows to model VTI mediums.

Figure 4:
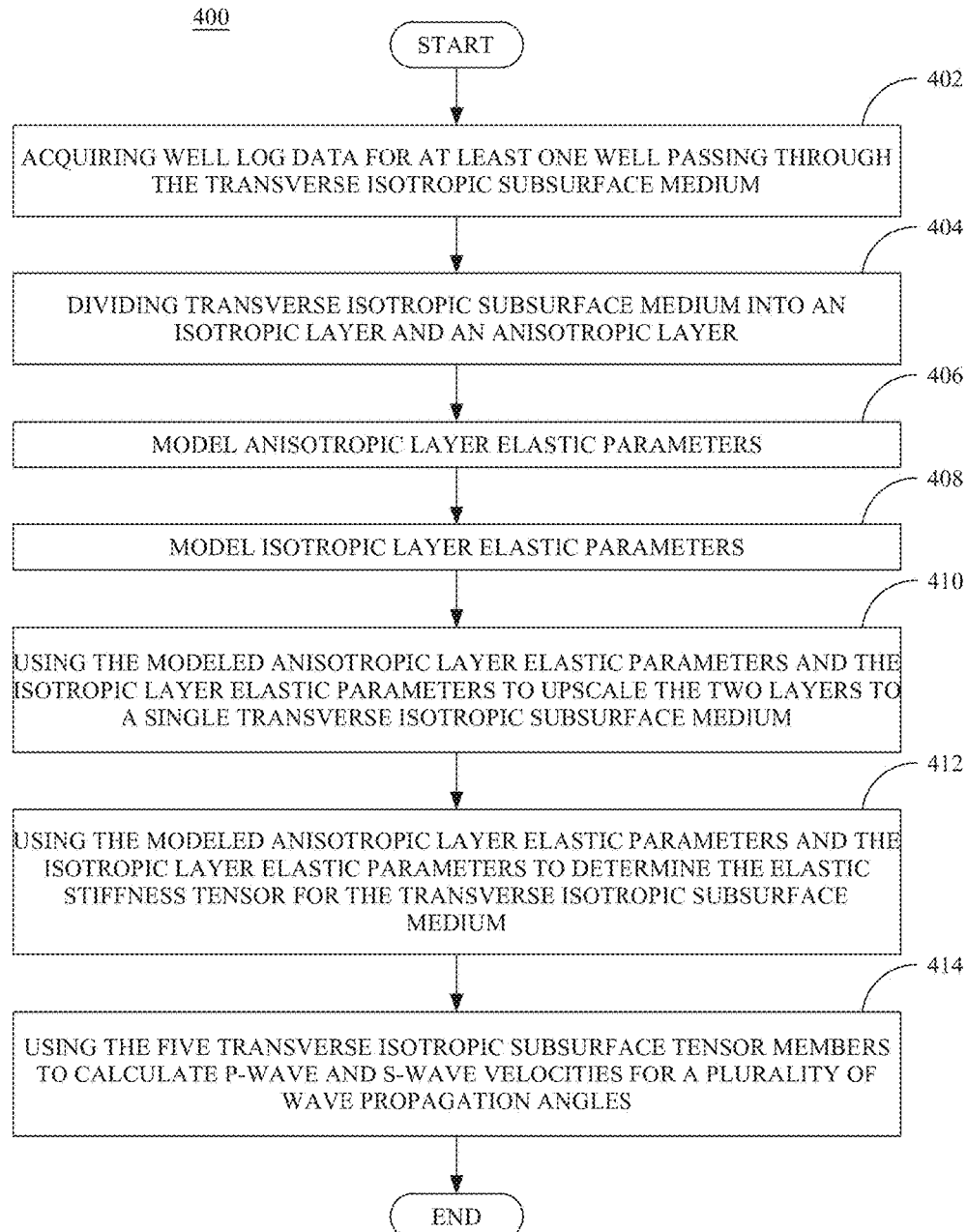
FIG. 4 is a flowchart of an embodiment of a method for modeling an elastic stiffness tensor in a transverse isotropic subsurface medium.

Referring now to FIG. 4, embodiments are directed to a method for modeling an elastic stiffness tensor in a transverse isotropic subsurface medium 400. Well log data are acquired for at least one well passing through the transverse isotropic subsurface medium. In one embodiment, well log data are acquired for a plurality of well passing through the transverse isotropic subsurface medium. The wells pass through the transverse isotropic subsurface medium perpendicular to the isotropic layers in the subsurface. For horizontal layers, the wells are vertical. In one embodiment, the well log data are acquired in a direction parallel to a symmetry axis passing through layers in the transverse isotropic subsurface medium. The well log data includes, but is not limited to p-wave velocity, s-wave velocity and density.

The transverse isotropic subsurface medium is divided into two layers, an effective anisotropic layer and an isotropic layer 404. The sum of an effective anisotropic layer volume fraction and an isotropic layer volume fraction equals one. Elastics parameters for the effective anisotropic layer are modeled 406. Suitable anisotropic layer effective elastic parameters include, but are not limited to, an anisotropic layer density, an effective anisotropic layer p-wave velocity and an effective anisotropic layer s-wave velocity. To model the anisotropic layer effective elastic parameters, an anisotropic layer density is calculated as a volume weighted average of all anisotropic component densities in the anisotropic layer, e.g., density of the anisotropic component multiplied by the volume of that component in the anisotropic layer. The effective anisotropic layer p-wave velocity and the effective anisotropic layer s-wave velocity are then modeled along a symmetry axis, i.e., $\theta=0$, of the transverse isotropic subsurface medium using a rock physics model selected in accordance with a source of anisotropy in the anisotropic layer. In one embodiment, the rock physics model is based on and includes intrinsic factors in the anisotropy layer, e.g., microstructure of the transverse isotropic subsurface medium such as grain alignment, or extrinsic factors, e.g., cracks and fractures, in the anisotropy layer. Suitable rock physics models include, but are not limited to, the Xu & White model, the Hudson model, the Hashin-Shetrikman boundary model, the Voit model and the Reuss model. In one embodiment, additional anisotropy data that are external to and in addition to the well log data are used in modeling the effective anisotropic layer p-wave velocity and the effective anisotropic layer s-wave velocity. Suitable additional anisotropy data include at least one of core data, core ultrasonic measurements for a plurality of wave propagation angles and seismic data.

Next, the isotropic layer elastic parameters are modeled using the anisotropic layer elastic parameters and the acquired well log data, i.e., the input data. Suitable isotropic layer elastic parameters include, but are not limited to, an isotropic layer density, an isotropic layer p-wave velocity and an isotropic layer s-wave velocity. In one embodiment, modeling the isotropic layer elastic parameters includes using measured p-wave velocity and measured s-wave velocity from the acquired well log data and modeled effective anisotropic layer p-wave velocity and effective anisotropic layer s-wave velocity in a simplified Backus model for a two layer transverse isotropic medium and wave propagation normal to layering in the two layer isotropic medium to model the isotropic layer elastic parameters, i.e., equation (7).

The modeled effective anisotropic layer elastic parameters and the modeled isotropic layer elastic parameters are used to upscale the effective anisotropic layer and the isotropic layer into the transverse isotropic subsurface medium comprising a single layer 410 and to determine the elastic stiffness tensor for the transverse isotropic subsurface medium 412.

In one embodiment, using the modeled effective anisotropic layer elastic parameters and the modeled isotropic layer elastic parameters to upscale the anisotropic layer includes using the effective anisotropic layer elastic parameters to determine two effective Lame's parameters ($\lambda_A$ and $\mu_A$) and using the isotropic layer elastic parameters to determine two Lame's parameters ($\lambda_I$ and $\mu_I$). The two effective anisotropic layer elastic tensor members and the two isotropic layer tensors are combined to yield five independent transverse isotropic subsurface medium elastic tensor members ($C_{11}$, $C_{12}$, $C_{13}$, $C_{33}$ and $C_{44}$), i.e., equation (6), which is the full Backus model.

In one embodiment, upscaling the modeled isotropic layer elastic parameters and the effective anisotropic layer elastic parameters further includes using the anisotropic layer elastic parameters to determine two effective anisotropic layer elastic tensor elements which results in two effective Lame's parameter for the anisotropic layer ($\lambda_A$ and $\mu_A$) and using the isotropic layer elastic parameters to determine two Lame's parameters for the isotropic layer ($\lambda_I$ and $\mu_I$). The two effective anisotropic layer elastic tensor members and the Lame's parameters are then combined to yield the five independent transverse isotropic subsurface medium elastic tensor members of the subsurface TI medium ($C_{11}$, $C_{12}$, $C_{13}$, $C_{33}$ and $C_{44}$).

In one embodiment, the five transverse isotropic subsurface elastic tensor members are used to calculate transverse isotropic subsurface medium p-wave velocities and transverse isotropic subsurface medium s-wave velocities for a plurality of wave propagation angles with respect to an axis of symmetry in the transverse isotropic subsurface medium 414.

Figure 5:
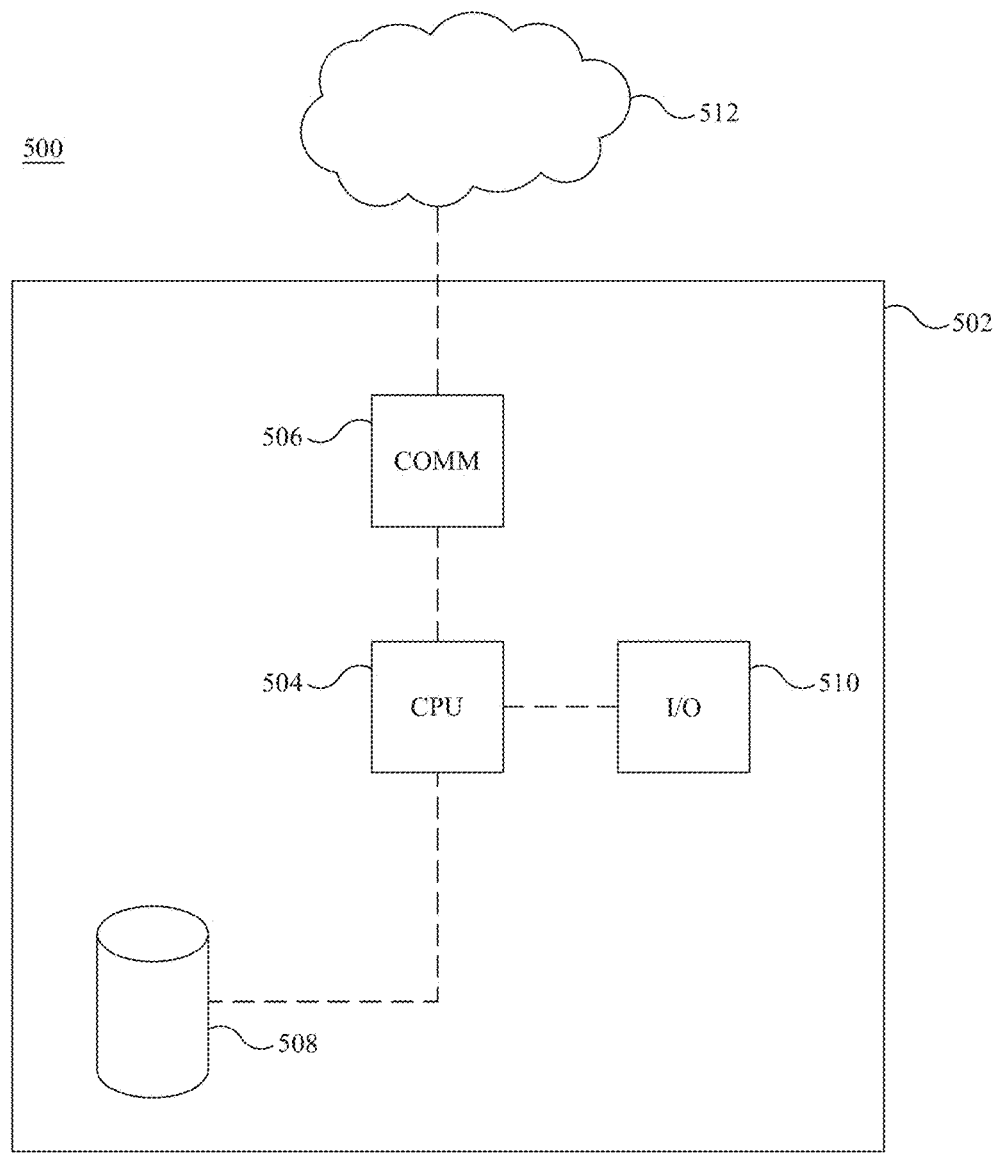
FIG. 5 is a schematic representation of an embodiment of a computing system for use in executing a method for modeling an elastic stiffness tensor in a transverse isotropic subsurface medium.

Referring now to FIG. 5, embodiments are directed to a computing system 500 for modeling an elastic stiffness tensor in a transverse isotropic subsurface medium. In one embodiment, a computing device for performing the calculations as set forth in the above-described embodiments may be any type of computing device capable of obtaining, processing and communicating multi-vintage seismic data associated with seismic surveys conducted at different time periods. The computing system 500 includes a computer or server 502 having one or more central processing units 504 in communication with a communication module 506, one or more input/output devices 510 and at least one storage device 508.

The communication module is used to obtain well log data, core data and dipole sonic data for a plurality of wells passing through a subsurface region in a project area. These well log data, core data and dipole sonic data can be obtained, for example, through the input/output devices. The well log data, core data and dipole sonic data are stored in the storage device. In addition, the storage device is used to store well log data for at least one well passing through the transverse isotropic subsurface medium. The input/output device can also be used to communicate or display the elastic stiffness tensor, modeled p-wave and s-wave velocities and any images or models generated for the transverse isotropic subsurface medium, for example, to a user of the computing system.

The processer is in communication with the communication module and storage device and is configured to divide the transverse isotropic subsurface medium into an effective anisotropic layer and an isotropic layer such that a sum of an anisotropic layer volume fraction and an isotropic layer volume fraction equals one, model effective anisotropic layer elastic parameters, model isotropic layer elastic parameters using the effective anisotropic layer elastic parameters and the acquired well log data and use the modeled effective anisotropic layer elastic parameters and the modeled isotropic layer elastic parameters to upscale the effective anisotropic layer and the isotropic layer into the transverse isotropic subsurface medium comprising a single layer and to determine the elastic stiffness tensor for the transverse isotropic subsurface medium.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 512. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 500 can be used to implement the methods described above associated with predicting hydraulic fracture treatment. Hardware, firmware, software or a combination thereof may be used to perform the various steps and operations described herein.

Methods and systems in accordance with embodiments can be hardware embodiments, software embodiments or a combination of hardware and software embodiments. In one embodiment, the methods described herein are implemented as software. Suitable software embodiments include, but are not limited to, firmware, resident software and microcode. In addition, methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for modeling an elastic stiffness tensor in a transverse isotropic subsurface medium in accordance with embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed embodiments provide a computing device, software and method for method for modeling an elastic stiffness tensor in a transverse isotropic subsurface medium. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method for modeling an elastic stiffness tensor in a transverse isotropic subsurface medium, the method comprising:
    acquiring well log data indicative of physical properties of the subsurface medium along a direction parallel to a symmetry axis along at least one well, the direction parallel to the symmetry axis passing through layers in the transverse isotropic subsurface medium;
    dividing the transverse isotropic subsurface medium into an effective anisotropic layer and an isotropic layer such that a sum of an effective anisotropic layer volume fraction and an isotropic layer volume fraction equals one;
    modeling effective anisotropic layer elastic parameters while taking into consideration a source of anisotropy;
    modeling isotropic layer elastic parameters using the anisotropic layer elastic parameters and the acquired well log data;
    using the modeled effective anisotropic layer elastic parameters and the modeled isotropic layer elastic parameters to upscale, with a processor, the effective anisotropic layer and the isotropic layer into the transverse isotropic subsurface medium comprising a single layer and to determine the elastic stiffness tensor for the transverse isotropic subsurface medium;
    calculating transverse isotropic subsurface medium p-wave velocities and transverse isotropic subsurface medium s-wave velocities based on the elastic stiffness tensor; and
    generating an image of the transverse isotropic medium based on the transvere isotropic subsurface medium p-wave velocities and the transverse isotropic subsurface medium s-wave velocities,
    wherein the elastic stiffness tensor and the transverse isotropic subsurface medium p-wave and s-wave velocities characterize anisotropy effects in reservoir geophysics.

2. The method of claim 1, wherein the effective anisotropic layer elastic parameters comprise an anisotropic layer density, an anisotropic layer p-wave velocity and an anisotropic layer s-wave velocity.

3. The method of claim 1, wherein the isotropic layer elastic parameters comprise an isotropic layer density, an isotropic layer p-wave velocity and an isotropic layer s-wave velocity.

4. The method of claim 1, wherein modeling the effective anisotropic layer elastic parameters further comprises:
    calculating an anisotropic layer density as a volume weighted average of all anisotropic component densities in the anisotropic layer; and
    modeling an anisotropic layer p-wave velocity and an anisotropic layer s-wave velocity along the symmetry axis of the transverse isotropic subsurface medium using a rock physics model selected in accordance with the source of anisotropy in the anisotropic layer.

5. The method of claim 4, wherein the rock physics model comprises intrinsic factors in the anisotropy layer or extrinsic factors in the anisotropy layer.

6. The method of claim 4, wherein modeling the effective anisotropic layer p-wave velocity and anisotropic layer s-wave velocity further comprises using additional anisotropy data comprising at least one of core data, core ultrasonic measurements for a plurality of wave propagation angles and seismic data.

7. The method of claim 1, wherein modeling the isotropic layer elastic parameters further comprises using measured p-wave velocity and measured s-wave velocity from the acquired well log data and modeled effective anisotropic layer p-wave velocity and effective anisotropic layer s-wave velocity in a simplified Backus model for a two layer transverse isotropic medium and wave propagation normal to layering in the two layer isotropic medium to model the isotropic layer elastic parameters.

8. The method of claim 1, wherein using the modeled effective anisotropic layer elastic parameters and the modeled isotropic layer elastic parameters to upscale the effective anisotropic layer and the isotropic layer into the transverse isotropic subsurface medium comprises:
using the effective anisotropic layer elastic parameters to determine two effective Lame's parameters ($\lambda_A$ and $\mu_A$); and
using the isotropic layer elastic parameters to determine two Lame's parameters ($\lambda_I$ and $\mu_I$).

9. The method of claim 8, wherein using the modeled effective anisotropic layer elastic parameters and the modeled isotropic layer elastic parameters to upscale the effective anisotropic layer and the isotropic layer into the transverse isotropic subsurface medium further comprises combining the effective anisotropic layer Lame's parameters ($\lambda_A$ and $\mu_A$) and the isotropic layer Lame's parameters ($\lambda_I$ and $\mu_I$) to yield five independent members of the transverse isotropic subsurface medium elastic tensor ($C_{11}$, $C_{12}$, $C_{13}$, $C_{33}$ and $C_{44}$).

10. The method of claim 9, wherein combining the two effective Lame's parameters of the anisotropic layer with two Lame's parameters of the isotropic layer further comprises using a full Backus model.

11. The method of claim 9, further comprising using the five independent transverse isotopic subsurface elastic tensor members ($C_{11}$, $C_{12}$, $C_{13}$, $C_{33}$ and $C_{44}$) to calculate the transverse isotropic subsurface medium p-wave velocities and transverse isotropic subsurface medium s-wave velocities for a plurality of wave propagation angles with respect to an axis of symmetry in the transverse isotropic subsurface medium.

12. The method of claim 1, wherein using the modeled effective anisotropic layer elastic parameters and the modeled isotropic layer elastic parameters to upscale the effective anisotropic layer and the isotropic layer into the transverse isotropic subsurface medium further comprises:
using the effective anisotropic layer elastic parameters to determine effective anisotropic layer Lame's parameters ($\lambda_A$ and $\mu_A$);
using the isotropic layer elastic parameters to determine two Lame's parameters for the isotropic layer ($\lambda_I$ and $\mu_I$); and
combining the effective Lame's parameters for the anisotropic layer and the Lame's parameters for the isotropic layer to yield independent transverse isotropic subsurface medium elastic tensor members for the subsurface medium.

13. A computer-readable non-transitory medium containing computer-executable code that when read by a computer causes the computer to perform a method for modeling an elastic stiffness tensor in a transverse isotropic subsurface medium, the method comprising:
acquiring well log data indicative of physical properties of the subsurface medium along a direction parallel to a symmetry axis along at least one well, the direction parallel to the symmetry axis passing through the transverse isotropic subsurface medium;
dividing the transverse isotropic subsurface medium into an effective anisotropic layer and an isotropic layer such that a sum of an effective anisotropic layer volume fraction and an isotropic layer volume fraction equals one;
modeling effective anisotropic layer elastic parameters while taking into consideration a source of anisotropy;
modeling isotropic layer elastic parameters using the anisotropic layer elastic parameters and the acquired well log data;
using the modeled effective anisotropic layer elastic parameters and the modeled isotropic layer elastic parameters to upscale the effective anisotropic layer and the isotropic layer into the transverse isotropic subsurface medium comprising a single layer and to determine the elastic stiffness tensor for the transverse isotropic subsurface medium;
calculating transverse isotropic subsurface medium p-wave velocities and transverse isotropic subsurface medium s-wave velocities based on the elastic stiffness tensor; and
generating an image of the transverse isotropic subsurface medium based on the transverse isotropic subsurface medium p-wave velocities and transverse isotropic subsurface medium s-wave velocities,
wherein the well log data is acquired inside a well and is indicative of physical properties of the subsurface medium p-wave and s-wave velocities characterize anisotropy effects in reservoir geophysics.

14. The computer-readable medium of claim 13, wherein modeling the effective anisotropic layer elastic parameters further comprises:
calculating an anisotropic layer density as a volume weighted average of all anisotropic component densities in the anisotropic layer; and
modeling an effective anisotropic layer p-wave velocity and an effective anisotropic layer s-wave velocity along the symmetry axis of the transverse isotropic subsurface medium using a rock physics model selected in accordance with the source of anisotropy in the anisotropic layer.

15. The computer-readable medium of claim 13, wherein modeling the isotropic layer elastic parameters further comprises using measured p-wave velocity and measured s-wave velocity from the acquired well log data and modeled effective anisotropic layer p-wave velocity and anisotropic layer s-wave velocity in a simplified Backus model for a two layer transverse isotropic medium and wave propagation normal to layering in the two layer isotropic medium to model the isotropic layer elastic parameters.

16. The computer-readable of claim 13, wherein using the modeled effective anisotropic layer elastic parameters and the modeled isotropic layer elastic parameters to upscale the effective anisotropic layer and the isotropic layer into the transverse isotropic subsurface medium further comprises:
using the effective anisotropic layer elastic parameters to determine two effective Lame's parameters ($\Delta_A$ and $\mu_A$); and
using the isotropic layer elastic parameters to determine two Lame's parameters ($\lambda_I$ and $\mu_I$).

17. The computer-readable medium of claim 16, wherein using the modeled effective anisotropic layer elastic parameters and the modeled isotropic layer elastic parameters to upscale the effective anisotropic layer and the isotropic layer into the transverse isotropic subsurface medium further comprises:
combining the effective Lame's parameters for the anisotropic layer and the Lame's parameters for the isotropic layer to yield independent elastic tensor members for the transverse isotropic subsurface medium.

18. The computer-readable medium of claim 17, wherein combining the two effective Lame's parameters for the anisotropic layer and the Lame's parameters for the isotropic layer further comprises using a full Backus model.

19. A computing system for modeling an elastic stiffness tensor in a transverse isotropic subsurface medium, the computing system comprising:
  a storage device comprising well log data indicative of physical properties of the subsurface medium along a direction parallel to a symmetry axis along at least one well, the direction parallel to the symmetry axis passing through the transverse isotropic subsurface medium; and
  a processor in communication with the storage device and configured to:
    divide the transverse isotropic subsurface medium into an effective anisotropic layer and an isotropic layer such that a sum of an effective anisotropic layer volume fraction and an isotropic layer volume fraction equals one;
    model effective anisotropic layer elastic parameters while taking into consideration a source of anisotropy;
    model isotropic layer elastic parameters using the effective anisotropic layer elastic parameters and the acquired well log data;
    use the modeled effective anisotropic layer elastic parameters and the modeled isotropic layer elastic parameters to upscale the effective anisotropic layer and the isotropic layer into the transverse isotropic subsurface medium comprising a single layer and to determine independent members of the elastic stiffness tensor for the transverse isotropic subsurface medium;
    calculate transverse isotropic subsurface medium p-wave velocities and transverse isotropic subsurface medium s-wave velocities based on the elastic stiffness tensor; and
    generate an image of the transverse isotropic medium based on the transverse isotropic medium based on the transverse isotropic subsurface medium p-wave velocities and the transverse isotropic subsurface medium s-wave velocities,
  wherein the elastic stiffness tensor and the transverse isotropic subsurface medium p-wave and s-wave velocities characterize anisotropy effects in reservoir peophysics.

* * * * *